2,836,792

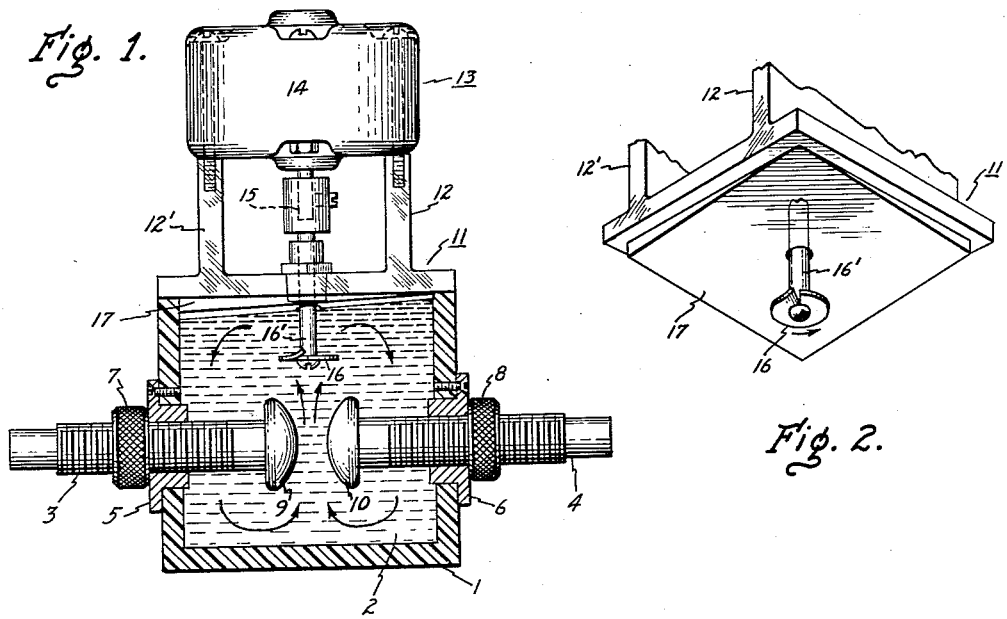
May 27, 1958     K. H. WEBER     2,836,792
DIELECTRIC TESTING DEVICE
Filed Jan. 30, 1956
Inventor
Kurt H. Weber,
by Gilbert P. Tarleton
His Attorney.

DIELECTRIC TESTING DEVICE

Kurt H. Weber, Pittsfield, Mass., assignor to General Electric Company, a corporation of New York Application January 30, 1956, Serial No. 562,192

11 Claims. (Cl. 324—61)

The present invention relates to dielectric testing devices, and more particularly to an apparatus for determining the breakdown strength of dielectric liquids.

Known insulating liquid testing devices of the above type have not proved satisfactory, in that they did not accurately reflect the voltage breakdown characteristics of the liquid being tested. Further, in a known standard type of dielectric gauge, the field produced by the electrode gap structure does not correspond closely enough to the more nearly uniform field conditions characteristic of liquid filled electrical apparatus presently being used, particularly in the case of transformers.

As a result, it has been found that the correlation between the insulating oil tests as carried out by known standard and other methods and the actual failure rate of the electrical devices in which the oil was used was not sufficiently close to provide a reliable indication of the suitability of the dielectric liquid tested. The prior testing arrangements apparently did not take into account the variations in dielectric strength of any particular oil sample and these devices tended to minimize the real differences in oil quality and oil strength.

It is an object of the present invention to provide an insulating liquid test device which overcomes the disadvantages of prior art gauges.

It is another object of the invention to provide a dielectric test device of the above type for readily detecting fluctuations in the quality of the oil or other liquid dielectrics to be used in electrical apparatus such as transformers.

It is another object of the invention to provide an insulating liquid testing device which indicates a practical end point for operations designed to improve oil quality, such as blending, drying, deaerating and filtering.

It is still another object of the invention to provide a testing device of the above type which simulates the more critical electric field configurations within the apparatus in which the oil is incorporated to such a degree that failures in the apparatus due to inadequately high quality of the liquid dielectric may be predicted and avoided.

It is a further object of the invention to provide a dielectric testing device by means of which a representative measurement may be obtained of both the mean value of the liquid dielectric strength and the variation of values from the mean which can be expected in actual use of the dielectric.

With the above objects in view, the present invention comprises a device for testing the dielectric strength of insulating liquids and the like, which comprises the combination of a vessel in which the insulating liquid is adapted to be contained, a pair of electrodes in the vessel having effectively spherical end portions facing each other and arranged with its spherical end portions spaced a predetermined distance from each other to provide a gap therebetween, and means for circulating the insulating liquid in the vessel through the gap. The circulating means in a preferred embodiment of the invention comprises an impeller disk arranged above the gap and driven by a vertical shaft rotated by a motor suitably mounted on the cover of the test vessel.

The invention will be better understood from the following description taken in conjunction with the accompanying drawing, in which:

Fig. 1 is an elevational view partly in section showing a preferred embodiment of the present invention;

Fig. 2 is a detailed fragmentary view of the cover structure of the device shown in Fig. 1;

Fig. 3 is a diagram of an electrical circuit which may be used in the operation of the present device.

Fig. 4a graphically illustrates the correlation between test results from the present dielectric gauge and performance of electrical units using the dielectric tested; and Fig. 4b is a graphical showing similar to that of Fig. 4a and relating to results obtained by a prior art gauge.

Referring now to the drawings, and particularly to Fig. 1, there is shown a container or test cell 1 made of a suitable material, such as methacrylate resin or the like, which is adapted to contain the insulating liquid or oil 2 under test. The container is preferably transparent as shown in order that the condition of the oil and the operation of the test may be viewed as the test proceeds. However, if desired, the container may be made of a suitable opaque insulating material. Preferably, the container is at least of a one quart capacity which is in contrast to the volume of known standard test devices which is usually about ⅛ of a quart. Electrodes 3 and 4 are threadably mounted in opposite walls of container 1 by means of sleeves 5 and 6, respectively. Knurled nuts 7 and 8 are provided for suitable adjustment of the spacing of electrodes 3, 4. The electrodes are provided with hemispherical end caps 9, 10 with rounded edges and are arranged facing each other and spaced apart a predetermined distance to provide the desired gap width. A cover 11 closes the top of the container 1, the cover having supporting members 12 and 12′ on which is mounted a liquid circulating device 13 comprising a motor 14 driven by any suitable electrical or other means, a shaft 15 driven by the motor, an impeller 16, and an impeller shaft 16′ coupled to shaft 15 and passing through an oversize aperture in cover 11. As shown, the impeller is in the form of a radially slit disk with one side of the slit bent away from the plane of the disk.

As more clearly shown in Fig. 2, cover 11 is provided with a wedge-shaped portion 17 on its underside which operates to outwardly displace excess liquid and air from the top of the liquid filled container 1 when it is set in place at the opening of the container. The speed of motor 14 and consequently the speed of impeller 16 is controlled as desired by any suitable electrical or other means (not shown).

Electrodes 3 and 4 are connected to a suitable source of voltage by means of which the voltage can be raised until breakdown occurs through the gap between the end portions 9, 10. Fig. 3 is an illustration of a circuit which may be satisfactorily used to provide the voltage desired. As shown in Fig. 3, there is provided a variable ratio auto-transformer 18 connected to a suitable source of line voltage 19, e. g. of 110 volts A. C., and a testing transformer 20 comprising primary and secondary windings, and a tertiary winding connected to a grounded voltmeter 21 to indicate the voltage at which the gap breaks down, the electrodes being connected to the secondary winding of the testing transformer.

As shown in the drawing, it is preferred that the impeller shaft extend vertically through the cover 11 and into the liquid-filled container 1. For best results the impeller disk 16 is arranged about half way between the top of the electrodes and the bottom of the cover, care being taken that the disk 16 is not so close to the gap as to distort the electrical field therein. In the arrangement shown, the action of the rotating impeller 16 provides several advantages. The impelling action of disk 16, rotating as shown in Fig. 2, circulates the oil in the vessel as shown by the arrows in Fig. 1, it moves the liquid upwardly through the gap between the electrodes and at the same time it draws any gaseous breakdown products upwardly toward the top of the container from which it escapes through the oversize aperture provided for entry of the impeller shaft. As a result, the oil sample is fully explored and the succeeding breakdown tests of the same sample are not affected by the presence of the breakdown products. Also, due to the arrangement shown it is not necessary to provide an oil seal around the impeller shaft to prevent escape of the liquid under test. Further, the illustrated construction of a combined cover and impeller assembly unit facilitates mounting of the impeller motor and enables ready assembly and disassembly of the entire structure.

While the electrode caps are shown as of hemispherical form, it will be understood that other spherical forms, including substantially complete spheres or segments thereof could be used in accordance with the invention. In addition to the advantages relating to closer correspondence to actual field conditions in the large-scale electrical devices which the test cell is designed to simulate, the spherical electrode form also facilitates proper adjustment of the gap spacing with any orientation of the electrode shanks. For example, where substantially completely spherical caps are employed, the electrode shanks may be arranged at right angles to each other, and the gap conditions would still be substantially the same as in the illustrated arrangement, an advantage which obviously could not be obtained in the case of the prior parallel-plate type of electrodes.

In the operation of the device described, the entire sample of the liquid 2 to be evaluated, e. g., mineral oil, is put into the container 1 at one time, the vessel being filled to the top. The cover 11 with attached impeller apparatus 13 is placed over the vessel opening in such manner that the excess insulating liquid is removed by the wedge 17, as already indicated. The motor 14 is then started to cause circulation of the oil in the container at a uniform speed to thereby assure that representative portions of the dielectric liquid flow through the gap. Voltage is applied to the electrodes by an initial setting of the auto-transformer, and by adjustment of the latter device, which is preferably motor driven, the voltage across the gap is raised at a constant rate until the gap breaks down, a condition which is noted from the voltmeter when the needle suddenly drops from its peak value or by observation of the test cell, or other manner.

In determining the breakdown characteristics of the oil sample a series of such tests is made and the various breakdown values are noted. From these values, the mean breakdown value and other significant statistical parameters, such as the coefficient of variation, are obtained, and from these data the suitability of the dielectric material is ascertained. From the variation data, for example, particular defects in the dielectric properties of the oil can be determined more sensitively than by the mean value.

It has been found, as shown hereinafter, that the voltage readings obtained from the described arrangement are particularly accurate in showing the dielectric strength of the liquid being tested, especially insofar as it relates to the electrical failure characteristics of the apparatus in which the oil is to be used.

In a typical construction of the present device, the volume of the sample container is about 1 quart, the impeller disk is about 9/16 of an inch in diameter, and the radius of the hemispherical electrodes is about 1 inch. These dimensions, however, are not critical. The gap spacing, for example, may be 80 mils although this spacing may be varied depending upon the voltage source available. It has been found, however, that the gap spacing should not exceed 80 mils normally because with this spacing or less it has been found that the device is more sensitive to solid contaminants in the insulating liquid.

Tests made of various types of electrode shapes showed conclusively that the variation of test devices in sensitivity to quality of the liquid dielectric varied greatly with the electrode shape. It has been found as a result of these tests that the present hemispherically capped electrodes when used within a sufficiently large volume of oil circulated by an impeller as described represented more accurately the electrical strength characteristics of apparatus utilizing liquid dielectrics such as transformers.

The configuration of the electrodes as shown, particularly when taken in conjunction with the impeller action as described, provides several advantages over the prior art test devices. The configuration of the gap between these spherical electrodes is such that the oil is allowed to pass freely therethrough, in contrast to the condition which exists in the case of the prior devices where sharp-edged parallel plate electrodes are used. In the latter type of device, due to the field generated, the breakdown products in the oil are confined within the space between the electrodes. In addition, the field generated by the parallel-plate electrodes does not approximate the uniform field conditions now encountered in present day transformer apparatus. The provision of the impeller in the arrangement as shown allows exploration of the entire sample in the container, it takes into account effects produced by solid contaminants in the sample, and provides for cleaning out all breakdown products from between the electrodes. It has been found, accordingly, that the arrangement of impeller and the particular electrode configuration as shown is such as to provide optimum results in the indication of breakdown characteristics of the insulating liquid under test.

Figs. 4a and 4b show the results obtained in a series of comparative tests demonstrating the improved reliability of the present dielectric gauge as compared to the standard gauge commonly used in the industry. Figs. 4a and 4b show the correlation between high and low breakdown voltage of oil samples, and the corresponding electrical failure of large-scale electrical devices in which the oil was a major insulation component. In these figures the breakdown voltage in kilovolts as measured by the respective gauges is plotted against the number of electrical units tested as represented by the number of oil samples having the same breakdown values. Fig. 4a shows the results obtained by the present dielectric gauge, while Fig. 4b shows those obtained by the prior standard gauge. The cross-hatched units represent units failing in test and the units with simple hatching are those which, while not failing in test, had certain electrical characteristics not up to desired levels.

In these tests, the same oil samples from the same 19 electrical devices were given dielectric tests in both the present gauge and the prior standard gauge to obtain the results shown, it being understood that the failure data in both Figures 4a and 4b for the 19 electrical devices was obtained from the same electrical strength test for each unit.

Comparing Fig. 4a with Fig. 4b, it will be seen that in every case where the present gauge showed a high level of breakdown strength in the oil tested, the electrical devices which incorporated the oil also showed a correspondingly high electrical strength. The appearance of failed units in the case of oil tested by the standard gauge where the gauge test indicated a dielectric strength at the higher portion of the breakdown voltage scale shows inadequate correspondence between gauge test results and practical performance. This unreliability is shown also by the occurrence of unit failure at breakdown voltages equal to or even considerably higher than those of units which did not fail in test.

Of particular significance in this connection is the much greater resolution, i. e., spread, in terms of breakdown voltage afforded by the present gauge, as shown by the Fig. 4a graph compared to that of Fig. 4b. Due to the greater resolution and the distinct demarcation between satisfactory and unsatisfactory samples now made possible, a much more certain and ready determination can be made of the performance characteristics of large-scale electrical units on the basis of results obtained by the dielectric testing device.

It will be evident, therefore, that the present device more accurately simulates the more critical field conditions within the transformer or other electrical apparatus than the prior known dielectric gauges and accomplishes this to such a degree that failures due to insufficiently high quality of the liquid dielectric may be readily foreseen and necessary measures taken to improve it.

While the invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Apparatus for testing the dielectric strength of insulating liquids comprising, in combination, a vessel for containing a predetermined amount of the insulating liquid, a pair of effectively spherical electrodes in said vessel spaced a predetermined distance from each other to provide a gap therebetween, and means for circulating the entire predetermined amount of the insulating liquid in said vessel through said gap.

2. Apparatus for testing the dielectric strength of insulating liquids comprising, in combination, a vessel for containing a predetermined amount of the insulating liquid, a pair of electrodes in said vessel having spherical end portions spaced a predetermined distance from each other to provide a gap therebetween, and means comprising a liquid impelling member for circulating the entire predetermined amount of the insulating liquid in said vessel through said gap.

3. Apparatus for testing the dielectric strength of insulating liquids and the like comprising, in combination, a vessel for containing a predetermined amount of the insulating liquid, a pair of electrodes in said vessel and having spherical end portions facing each other, said spherical end portions being spaced along an axis a predetermined distance from each other to provide a gap therebetween, and means for circulating the entire predetermined amount of the insulating liquid in said vessel through said gap, said circulating means comprising a liquid impelling member in said vessel spaced from said gap and rotatable about an axis transverse to said first-mentioned axis.

4. Apparatus for testing the dielectric strength of insulating liquids comprising, in combination, a vessel for containing a predetermined amount of the insulating liquid, a pair of electrodes in said vessel having spherical end portions spaced along an axis a predetermined distance from each other to provide a gap therebetween, and means for circulating the entire predetermined amount of the liquid in said vessel through said gap comprising a liquid impelling member in said vessel spaced from the gap and being rotatable about an axis normal to said first-mentioned axis, the axis of said rotatable member passing approximately midway between said spaced electrode end portions.

5. Apparatus for testing the dielectric strength of insulating liquids comprising, in combination, a vessel for containing a predetermined amount of the insulating liquid, a pair of electrodes in said vessel having spherical end portions spaced a predetermined distance from each other to provide a gap therebetween, means for circulating the entire predetermined amount of the insulating liquid in said vessel through said gap, and means for applying an electrical potential between said electrodes.

6. Apparatus for testing the dielectric strength of insulating liquids comprising, in combination, a vessel for containing a predetermined amount of the insulating liquid, a pair of electrodes in said vessel having spherical end portions spaced a predetermined distance from each other to provide a gap therebetween, means for circulating the entire predetermined amount of the insulating liquid in said vessel through said gap, means for applying varying electrical potential between said electrodes, and means for indicating the breakdown voltage of the insulating liquid in said vessel.

7. Apparatus for testing the dielectric strength of insulating liquids comprising, in combination, a vessel in which the insulating liquid is adapted to be contained, said vessel being open at its top; a pair of electrodes in said vessel having spherical end portions spaced a predetermined distance from each other to provide a gap therebetween; and a combined cover and liquid impeller assembly unit mounted at the top of said vessel for enclosing the same and for circulating the insulating liquid therein through said gap.

8. Apparatus for testing the dielectric strength of insulating liquids comprising, in combination, a vessel in which the insulating liquid is adapted to be contained, said vessel being open at its top; a pair of electrodes in said vessel having spherical end portions spaced a predetermined distance from each other to provide a gap therebetween; and a combined cover and liquid impeller assembly unit mounted at the top of said vessel for enclosing the same and for circulating the insulating liquid therein through said gap, said assembly unit comprising a cover member, an elongated member extending through said cover member and having an impelling member at its lower end extending transverse thereto and arranged spaced above said gap, and driving means mounted on said cover member and connected to said elongated member for driving said impelling member.

9. An apparatus as defined in claim 8, wherein said cover member is formed with an aperture through which said elongated member passes with substantial clearance to allow escape of gaseous breakdown products from said vessel.

10. An apparatus as defined in claim 9, wherein the underside of said cover member is inclined to provide for outward displacement of excess insulating liquid and air from the top of said vessel during mounting of said assembly unit on said vessel.

11. Apparatus as defined in claim 1, in which the electrodes are normally in horizontal alignment and the direction of circulation of liquid through said gap is vertically upward.

References Cited in the file of this patent

UNITED STATES PATENTS

| 1,371,378 | Klauber | Mar. 15, 1921 |
| 1,870,282 | Cover | Aug. 9, 1932 |
| 1,926,084 | Clark | Sept. 12, 1933 |
| 1,937,744 | Clark | Dec. 5, 1933 |
| 2,567,921 | Boehm | Sept. 18, 1951 |
| 2,656,508 | Coulter | Oct. 20, 1953 |

FOREIGN PATENTS

| 560,598 | Germany | Oct. 4, 1932 |